Oct. 18, 1955  G. D. BRENT ET AL  2,720,855
FERRULE HEATING UNIT FOR A LEAD WIRE FERRULE BRAZING MACHINE
Filed Nov. 27, 1951  2 Sheets-Sheet 1

INVENTORS
G. D. BRENT
E. K. BEE.
BY
ATTORNEY

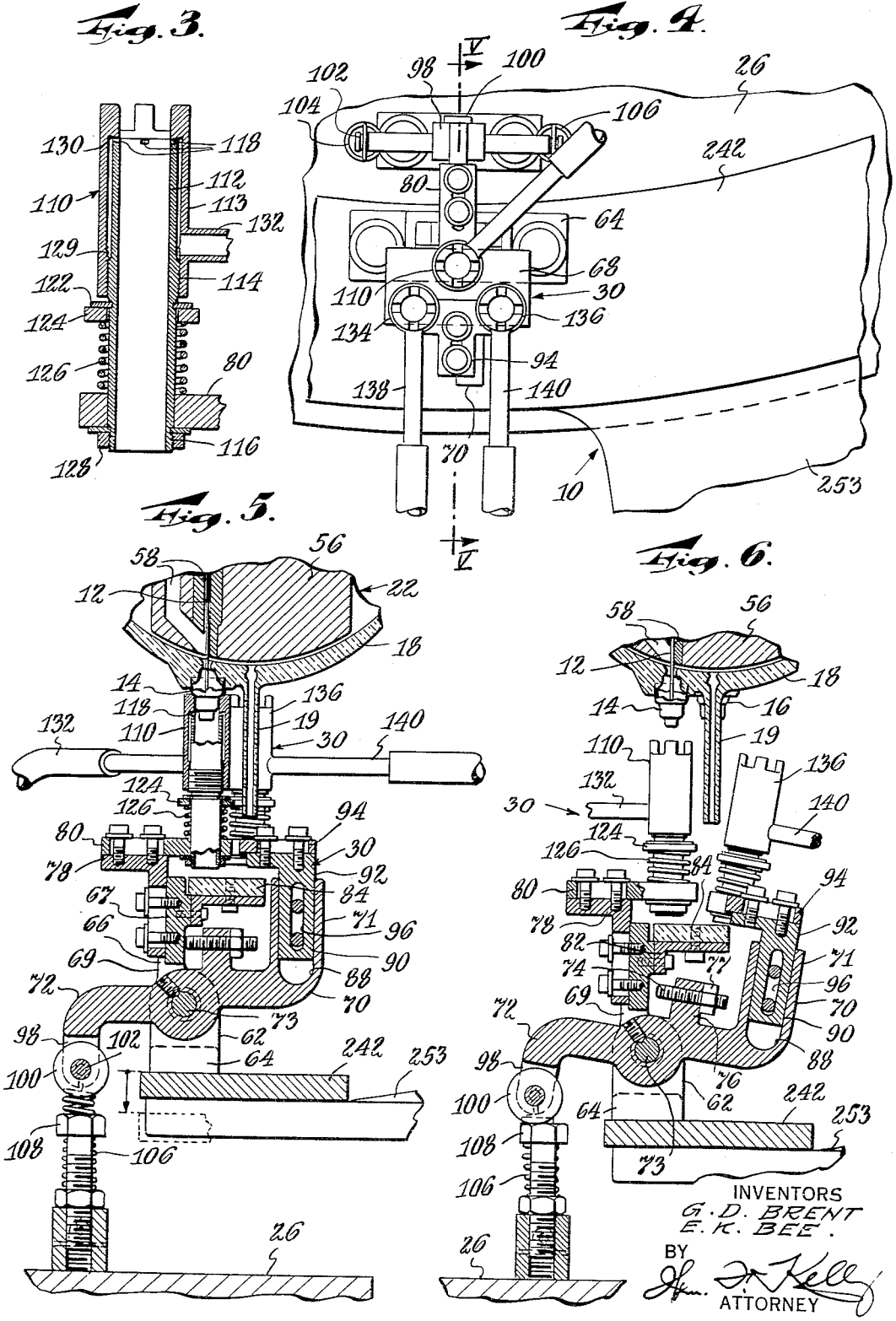

United States Patent Office 2,720,855
Patented Oct. 18, 1955

2,720,855

FERRULE HEATING UNIT FOR A LEAD WIRE FERRULE BRAZING MACHINE

George D. Brent, Bloomfield, N. J., and Ernest K. Bee, Fairmont, W. Va., assignors to Westinghouse Electric Corporation, East Pittsburgh, Pa., a corporation of Pennsylvania Application November 27, 1951, Serial No. 258,477

2 Claims. (Cl. 113—59)

This invention relates to the manufacture of "sealed beam" lamps and, more particularly, to a 16 head machine for brazing the filamentary lead-in conductor to the ferrules of a sealed beam reflector ferrule assembly.

In the manufacture of "sealed beam" lamps, the ferrules are inserted and sealed to the ferrule embossings of the sealed beam reflector on an automatic ferrule inserting and tabulating machine. The sealed reflectors are transferred by conveyor to an automatic brazing machine for brazing the leading-in conductors to the ferrules.

This brazing machine, suitably 16 head and essentially as disclosed in the McGowan et al. application, Serial No. 211,956, filed February 20, 1951, and assigned to the same assignee as the present invention, is loaded or charged with a reflector at station No. 1 and is provided with two series of ferrule heating stations 3 to 6 and 7 to 9. At station 3, a ball shaped solder pellet, suitably silver, is dropped into each ferrule. Soldering flux is introduced at station 4. At station 7 the lead wires are automatically loaded into the ferrules. Hydrogen flows about the heated ferrules to remove oxidation therefrom and to prevent reoxidation thereof at station 10. At stations 11 to 15 air-cooling is employed to cool the soldered assembly. The soldered reflector assembly is then unloaded or discharged at station 16.

In the past at the two series of heating stations, stations 3 to 6 and stations 7 to 9, the ferrules have been heated by flat fish-tail burners, such as American Gas Furnace burners No. 18, suitably arranged about the ferrules, so that opposite sides of each ferrule are heated in alternate stations. Because of the close proximity of the ferrule seal to the heated area, the height setting of these burners is critical, if strained and cracked seals are to be avoided. Further, uneven peripheral heating and burned ferrules result from this alternate side heating method.

Hence it has been found advantageous to employ a ferrule heating unit of our invention having a circular burner about each ferrule at each heating station 3 to 6 and 7 to 9. Two of the circular burners at each station are mounted on a pivot bracket which moves out of the way of the reflector tubulation when a reflector ferrule assembly indexes to the next station. The third burner in each station is mounted on a stationary bracket. The ferrule heating units are mounted on a pair of manifold plates attached to the machine frame, preferably three on one plate and four on the other, and are simultaneously raised with proper timing up to the ferrules and back by vertically reciprocating means.

The circular burner of our invention comprises a hollow outer shell and a hollow inner body which threads onto said housing. Gas is fed from the inlet line to the burner into the cavity between the shell and the body and from said cavity through four quadrantal grooves or jets cut in the upper end of said threaded body. These quadrantal grooves supply uniform heat at uniform height to the ferrule contained therein. Further, when these grooves or jets become enlarged or burned out, the upper end of the inner sleeve is easily reconditioned by machining new quadrantal grooves therein. By this method longer life is imparted to each burner. In addition, the burners of our invention are shielded from convectional air currents and do not easily get out of adjustment. The fires about the ferrules are evenly distributed, thereby preventing the burning of said ferrules. In addition, the fire height with respect to the ferrule seal is easily controlled and strained and cracked ferrule seals are eliminated.

In its general aspect, the present invention has as its objective the elimination of the disadvantages and defects of the prior art ferrule heating unit of a machine for brazing lead wires to the ferrules of sealed beam reflectors.

Another object of the invention is a ferrule heating unit for the heating stations of a lead wire-ferrule brazing machine which will not burn the ferrules.

A further object is a ferrule heating unit for a lead wire ferrule brazing machine for sealed beam lamps which is easy to adjust for a desired height of fire setting.

An additional object of the invention is a ferrule heating unit for a lead wire-ferrule brazing machine for sealed beam lamps which produces uniform heating about the individual ferrules.

A still further object is a ferrule heating unit for a lead wire-ferrule brazing machine which does not strain or crack the ferrule reflector seals.

Another specific object is a circular burner for a ferrule heating unit of a lead wire-ferrule brazing machine which has a long life and is readily recoverable by inexpensive machining methods.

Another object is a ferrule heating unit for a heating station of a lead wire-ferrule brazing machine for sealed beam lamps comprising two circular burners, one for each individual end ferrule, mounted on a pivoted bracket or rocker arm which moves out of the way of the reflector exhaust tubulation when a reflector ferrule assembly indexes to the next station, and a third circular burner for the center ferrule mounted on a stationary bracket or mounting and support plate.

Other objects and advantages of the present invention will appear to those skilled in the art to which it appertains as the description thereof proceeds, both by direct recitation thereof and by implication from the context.

Referring to the accompanying drawings, in which like numerals of reference indicate similar parts throughout the several views:

Fig. 3 is a sectional view of a circular burner of our invention;

Fig. 4 is a plan view of one heating station of the machine of Fig. 1;

Fig. 5 is a sectional view of one heating station of the machine of Fig. 1, taken along the line V—V in the direction of the arrows of Fig. 4, showing the ferrule heating unit in the heating position;

Fig. 6 is a view similar to Fig. 5, showing the ferrule heating unit in the indexing position.

Figure 1:
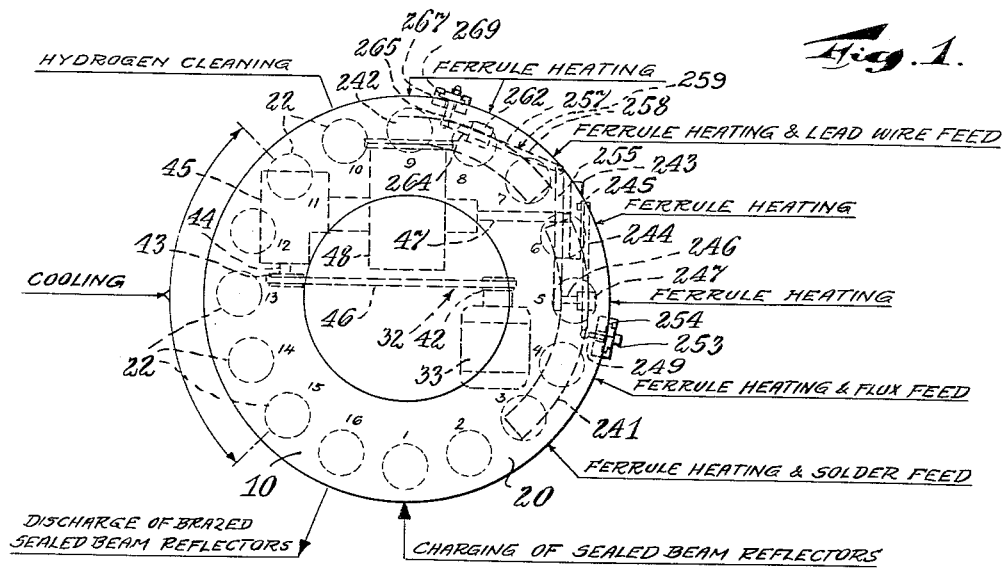
Fig. 1 is a plan view of a brazing machine for securing leads to the ferrules of a sealed beam reflector ferrule assembly embodying the ferrule heating unit of our invention.

In Figs. 1, 5 and 6, of the drawing is shown a machine 10 for brazing or soldering a leading-in conductor 12 to each of the three contact ferrules, namely center ferrule 14 and end ferrules 16 of an aluminized or reflecting portion 18 of a sealed beam lamp termed "reflectors" for short. This reflector 18 is also provided with an exhaust tubulation 19, suitably axial thereto.

This machine may comprise a rotatable or indexable spider 20 (Fig. 1) for carrying a plurality of heads 22 (16 in the present showing) and keyed to a vertical shaft 25 (Fig. 2), a stationary frame portion 26 (Figs. 5 and 6) on the shaft 25, a pedestal 28 for supporting the shaft 25 and the frame portion 26, ferrule heating units 30 of our invention on the frame portion 26 aligned beneath the heads 22 in stations 3 to 6 and 7 to 9, driving means 32 (Fig. 1) for indexing the machine 10 from station to station and means 34 for vertically reciprocating said ferrule heating units 30.

Driving means for indexing the spider

This indexing means 32 is disclosed in McGowan et al. application Serial No. 211,956, filed February 20, 1951. It is driven from a single source of power, such as a motor 33 (Fig. 1), so that the parts operate in desired synchronism. The motor 33 has a pulley or sprocket wheel 42 which drives a pulley or sprocket wheel 43 on a shaft 44 from a reduction gear box 45 by means of a belt or chain 46. Turning of the shaft 44 causes rotation of a shaft 47 to which it is geared. This in turn causes the step by step rotation or indexing of the spider 20 by means of the mechanism in an indexing gear box 48. This mechanism includes a cam wheel (not shown) with axially offset portions sequentially engaging rollers 50 on arms 52 outstanding from the shaft 25 (Fig. 2) to which they are secured. Such mechanism being standard in such equipment has not been herein shown or described in detail. However, reference is made to Green Patent No. 2,569,852, issued October 2, 1951, and assigned to the same assignee as the present invention, which shows such mechanism for suitable operation of the rollers 50 carried by the arms 52.

Heads

Figure 2:
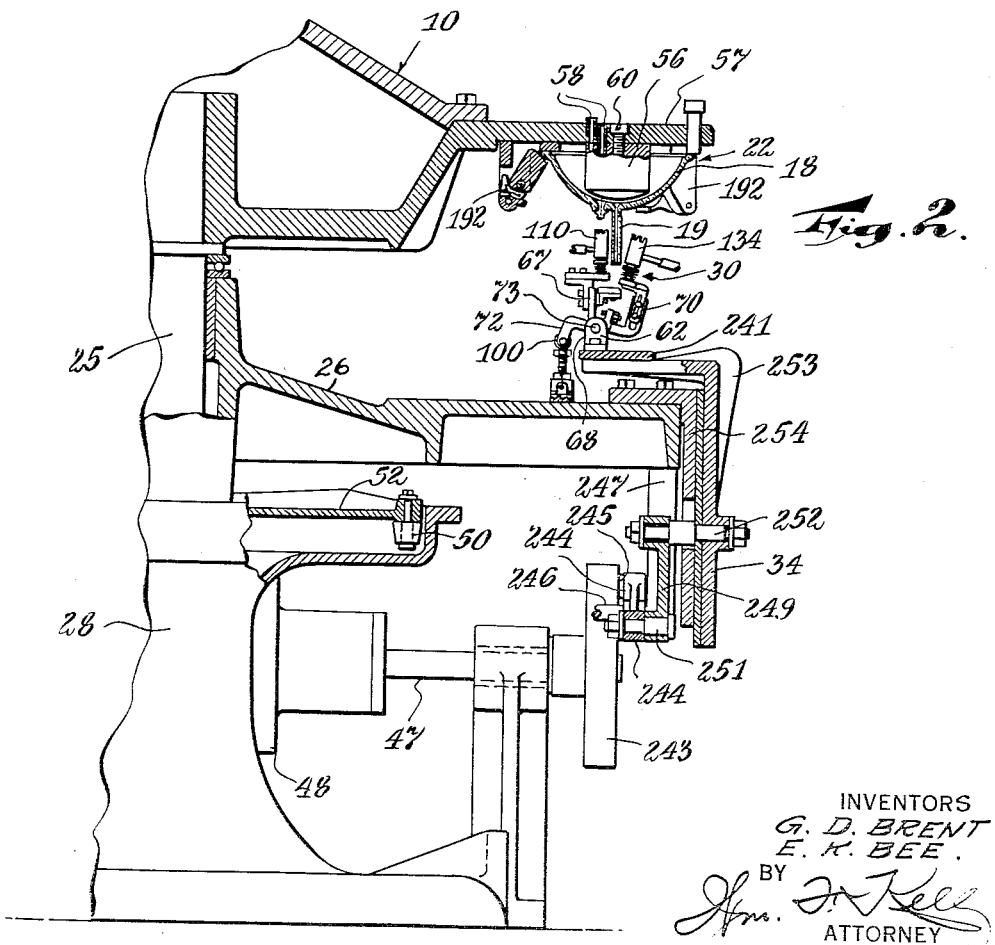
Fig. 2 is a side elevational view of one heating station of the machine of Fig. 1.

As shown in Fig. 2, each head 22 consists of a block 56 carried on the lower surface of a peripheral plate portion 57 of the spider 20 in which are passages 58 for feeding reflector processing materials, such as solder pellets, flux and leading-in conductors 12 to the ferrules 14 and 16, and a plurality of, in this showing 3, latches or reflector clamping cams 192 which underlie the rim of a reflector 18 and hold said reflector in place. A bolt 60 secures the block 56 to the plate portion 57.

Means for vertically reciprocating the ferrule heating units

The means 34 for vertically reciprocating the ferrule heating units 30 is essentially the same as the mechanism for vertically reciprocating the fires and operating the feed mechanism for the solder, flux and leads, as disclosed in the above-mentioned McGowan et al. application Serial No. 211,956, filed February 20, 1951. The heating units 30 of the present invention are mounted on a pair of manifold plates 241 and 242, preferably three on one plate (242) for stations 7 to 9 and four on the other (241) for stations 3 to 6, as shown particularly in Figs. 1 and 2. As each reflector 18 is indexed at a given station by the driving means 32 for indexing the spider 20, the means 34 for vertically reciprocating the units 30 (Fig. 2) is similarly activated by a manifold-operating or fire-lifting cam 243 fixed on the shaft 47 of the driving means 32. Rotation of the cam 243 oscillates a lever 244 carrying a roller 245 riding in the cam and fixed on a shaft 246 (shown in Fig. 1) carried by a bracket 247 from the frame portion 26 of the brazing machine 10. The other end of the lever 244 is connected to a link 249 (Figs. 1 and 2) by a pivot pin 251. The other end of said link is pivotally connected by pin 252 (Fig. 2) to a manifold supporting member 253 slidably mounted in a guide 254 carried by the frame portion 26. This shaft 246 is extended inwardly (as shown in Fig. 1) and has fixed thereto a crank 255 the free end of which is connected to a link (not shown). The other end of said link is pivotally connected to the arm 258 (Fig. 1) of a bell crank lever 259. The lever 259 is pivotally connected to a bracket 262 carried by the frame portion 26. The other arm 264 of the lever 259 is pivotally connected to a link 265. The other end of this link 265 is pivotally connected to a manifold supporting member 267 like member 253. This supporting member is likewise slidably mounted in a guide 269 similar to 254 and carries the manifold plate 242.

Ferrule heating unit

Each of the ferrule heating units 30 has a mounting and supporting plate 62 having, as shown in Fig. 2, a bottom flanged portion 64 (Fig. 5) secured, as by bolts, to a manifold plate such as 242 and an upper generally inverted U-shaped portion 66 with a top horizontal member 67 and vertical side members 68 and 69 (Fig. 2) depending from portion 67 to flanged portion 64. A rocker arm or pivot lever 70 of generally S-shaped configuration is fixed, as by a set screw, to a shaft 73 rotatable in the upper portions of members 68 and 69. The arm 70 oscillates on shaft 73 between members 68 and 69. This rocker arm 70 has an upper portion 71 and a lower portion 72. Above rocker arm 70 upper portion 67, as shown in Fig. 2, provides its inner surface as a stop for limiting the forward motion of a bolt 74 adjustable in a threaded hole of a lug 76 on the rocker arm 70. A nut 77 locks bolt 74 in the desired adjustment.

An angle 78 for securing a stationary burner plate 80 thereon is provided with a vertical adjustable slot and is affixed, as by bolts, through said slot to the outside of upper portion 67 of portion 66 of plate 62. A longitudinal slot is provided in plate 80 for any desired horizontal adjustment thereof. Above lug 76 and secured to the inside of said upper portion 67 is another angle 82 for mounting, as by bolts, a heat baffle plate 84 of any suitable refractory material. This baffle 84 extends substantially from top member 67 of the mounting plate 62 to the upper portion 71 of rocker arm 70.

This upper portion 71 of rocker arm 70 has a groove 88 in one longitudinal face for receiving the lower element 90 of an angle 92. On this angle 92 is mounted, as by bolts, an oscillating burner mounting plate 94. The lower element 90 of angle 92 is affixed in groove 88 in any desired position by two bolts extending through a longitudinal adjustment slot 96 therein.

The lower portion 72 of rocker arm 70 has a forked like extremity 98 in which a roller 100 is rotatable on a pin 102 projecting beyond both sides of the extremity 98 a substantial distance. At one end of pin 102 is a recovery spring 104 having its upper end secured thereat, as in the showing of Fig. 4, in an annular groove provided therein and having its lower end affixed to frame portion 26 of machine 10. A like spring 106 similarly mounted is provided at the other end of pin 102. Suitably between the springs 104 and 106 is an adjustable stop 108 for limiting the downward travel of the roller 100 in the lower portion 72 of arm 70. In this case stop 108 is a bolt threaded into a suitable hole in a hub on the frame portion 26 and locked in the desired position by a nut.

Burners

As shown in Figs. 4, 5 and 6, a circular burner 110 of our invention for heating a center ferrule 14 of a reflector 18 is mounted on the inner end of stationary burner plate 80. This burner 110, shown in Fig. 3, consists of a hollow body 112 and a shell 113 adjustable on the body 112. The body 112 has a threaded middle portion 114, a threaded lower portion 116 and four quadrantal grooves 118 cut into its upper end. Below the threaded middle portion 114 a spring stop 122 is secured in an annular groove. A spring follower 124 is held against stop 122 by a spring 126 about the body 112. This spring 126 has its lower end resting on the plate 80. The threaded lower portion 116 of body 112 projects through a suitable hole in plate 80 and is secured therein by a circular nut 128.

The shell 113 (Fig. 3) is threaded internally on its lower end 129 to screw on to the middle portion 114 of body 112. A lip 130 formed on the upper end is provided for shielding the quadrantal grooves 118 from convectional air currents and directing the flow of gas therethrough. Above the threaded portion 129 of the shell 113 a gas inlet line 132 is provided for introducing gas between the body 112 and the shell 113 from whence it flows through the quadrantal grooves 118 in the body 112.

The horizontal and vertical positioning of burner 110 (Figs. 5 and 6) with respect to the center ferrule 14 is readily obtained by means of the slot in plate 80 and the vertical slot in the angle 78 respectively.

Two oscillating burners 134 and 136 having gas inlet lines 138 and 140 respectively and being similar in construction to burners 110 are similarly affixed to the oscillating burner mounting plate 94 (Figs. 5 and 6). The horizontal position of these burners with respect to the end ferrules 16 of a reflector 18 is adjusted by means of the bolt 74 projecting from the lug 76 on the rocker arm 70. Its vertical position is secured by means of the adjustment of the lower element 90 of angle 92 in the groove 88 in the upper portion 71 of the arm 70.

*Operation*

According to our invention, the driving means 32 for indexing the spider 20 causes the continuously rotating shaft 47 and the ferrule heating unit lifting cam 243 to rotate once each index period of operation. As the processing on each reflector 18 at a given station is completed, the cam 243 causes the cam engaging end of the pivoted lever 244 (as viewed from Fig. 2) to move upwardly and the opposite end of said lever, which engages the manifold supporting member 253 through link 249, and hence the three ferrule heating units 30 on the manifold plate 241 to move downwardly. Simultaneously, as shown in Figs. 1 and 2, rotation of the shaft 246 causes the crank 255, a link (not shown), and the arm 258 of the bell crank lever 259 pivoted on the bracket 262 to move in an upwardly direction. The other arm 264 of bell crank lever 259, the manifold supporting member 267 connected to arm 264 by the link 265 and the manifold plate 242 carrying four ferrule heating units 30 move downwardly.

During the downward motion of each ferrule heating unit 30 the roller 100 in the fork-like lower extremity 98 of rocker arm 70 strikes the stop 108 on frame 26 (Fig. 6), thereby causing the upper portion 71 thereof and hence the oscillating burners 134 and 136 on plate 94 to pivot outwardly from the stationary burner 110, as shown in Fig. 6. This permits the passage of the tubulation 19 between the stationary burner 110 and the oscillating burners 135 and 136 as the reflector 18 indexes to the next operating station.

When another reflector 18 has indexed into the same station, the cam 243 on shaft 47 causes the upward motion of the manifold supporting members 253 and 267, the manifold plates 241 and 242, and ferrule heating units 30 affixed thereto. As the heating units 30 start upward the recovery springs 104 and 106 secured on the ends of the roller pin 102 oscillate the upper portion 71 of rocker arm 70 and hence the oscillating burners 134 and 136 inwardly toward burner 110 into a vertical position beneath the end ferrules 16 of the reflector 18. The burner unit 30 and hence the stationary burner 110 and the oscillating burners 134 and 136 continue upwardly into position about the center ferrule 14 and the end ferrules 16 respectively for the desired heating or brazing operation.

It can thus be seen that a ferrule heating unit 30 for a machine 10 for brazing lead wires to the ferrules of a sealed beam lamp is herein provided in which the disadvantages and defects of the prior art ferrule heating unit have been eliminated. Our ferrule heating unit will not burn the ferrules, is easy to adjust for a desired height of fire setting, produces uniform heating about the individual ferrules, and does not strain or crack the ferrule reflector seals. Our ferrule heating unit 30 comprises two oscillating circular burners 134 and 136 (one for each of the individual end ferrules 16) mounted on a rocker arm 70 which moves out of the way of the reflector exhaust tubulation 19 during indexing from station to station, and a third stationary circular burner 110 for the center ferrule 14 mounted on a stationary mounting and support plate 62. Each of the circular burners, such as stationary burners 110 or oscillating burners 134 and 136 for our ferrule heating unit 30 has a long life and is readily recoverable by inexpensive machining methods.

Whereas a preferred embodiment of our invention has been disclosed, it will be understood that modifications may be made within the spirit and scope of the appended claims.

We claim:

1. In a brazing machine for brazing a plurality of lead in conductors to a like number of ferrules of a sealed beam lamp reflector assembly a ferrule heating unit comprising a vertically reciprocable mounting and supporting plate having an upwardly extending body provided with upstanding side members, an upstanding stationary circular burner on the upper portion of one of said side members and vertically reciprocable into and out of engagement with one of said ferrules, a shaft rotatable on the upper portions of said side members, a cam actuated bell crank lever on said shaft and rotatable between said side members, said lever having a cam engaging arm on one side and a vertically extending arm on the other side of said shaft, a plurality of upstanding circular burners mounted on said vertically extending arm, cam means for swinging said lever to bring said latter burners adjacent to said stationary burner and into alignment with a like number of said ferrules and means to vertically move said supporting plate to move all of said burners into position about their respective ferrules to heat the same.

2. In a brazing machine for brazing a plurality of lead in conductors to a like number of ferrules of a sealed beam lamp reflector assembly, a ferrule heating unit as in claim 1 except means on the lower portion of said cam engaging arm for engaging a stop and limiting the downward travel of said cam engaging arm and means on said vertically extending arm for engaging said body and limiting the forward motion of said vertically extending arm.

References Cited in the file of this patent

UNITED STATES PATENTS

| | | |
|---|---|---|
| 2,050,088 | Dichter | Aug. 4, 1936 |
| 2,069,386 | Palucki | Feb. 2, 1937 |
| 2,082,080 | Palucki | June 1, 1937 |
| 2,237,186 | Malloy | Apr. 1, 1941 |
| 2,297,950 | Flaws | Oct. 6, 1942 |
| 2,531,015 | Thompson | Nov. 21, 1950 |